United States Patent Office.

HIRAM CURTIS, OF NEW YORK, N. Y., ASSIGNOR TO EDWARD P. CURTIS AND STEPHEN D. LAW.

*Letters Patent No. 71,585, dated December 3, 1867; antedated November 15, 1867.*

IMPROVEMENT IN THE MANUFACTURE OF PAINT.

*The Schedule referred to in these Letters Patent and making part of the same.*

TO ALL WHOM IT MAY CONCERN:

Be it known that I, HIRAM CURTIS, of the city of New York, in the county of New York, and State of New York, have discovered a new and useful Improvement in the Process of the Manufacture of Paint; and I do hereby declare that the following is a full, clear, and exact description thereof, and of its mode or manner of operation.

My invention or discovery has relation to such paints as are in part composed of finely-ground and pulverized marble or carbonate of lime, and is confined more particularly to the treatment or preparation of such pulverized marble, so as to fit it for use as a paint.

When pulverized or ground marble is used to any considerable extent or proportion in the composition of paint, as in the paint described in the Letters Patent granted June 23, 1863, to Stephen D. Law and Edward P. Curtis, it is found in the practical use of such paint that when it is spread upon new wood-work, as a priming coat, where the oil is likely to be absorbed more rapidly, that such paint does not always adhere sufficiently to the surface on which spread, but has a tendency to follow the brush, or roll upon and from the painted surface. Such tendency, though not so great when such paint is spread as a second coat, or on metallic or other hard surfaces, more or less interferes with the application or use of the paint, and also causes the surface to appear less smooth and uniform.

My invention or discovery has reference to a manner of preparing such pulverized marble by which such tendency is removed, and the paints made therefrom rendered more valuable.

In compounding the paint before referred to, the marble is first finely pulverized or ground, and then carbonate of lead and of zinc mixed therewith in certain proportions, and the whole then ground in oil in the usual manner, and afterwards thinned, when it is to be applied with a brush, as other paints.

My invention or discovery consists in subjecting such marble dust or finely-ground marble, after it has been brought to the desired or required fineness, to a water-bath, in any convenient and suitable vessel or receptacle, and stirring the whole mass until every portion of the marble dust has been submitted to the action of the water. The marble dust is then allowed to settle, and the water drawn off, and the material permitted to dry, when it is again powdered, (which, however, is very easily accomplished,) and is then ready to be mixed with the other materials and ground in oil. As the marble dust is thrown into or wet by the water, and then stirred, some effervescence, more or less, takes place, and the agitation should be continued as long as any such effect is produced. Sometimes, also, more or less scum will be found rising to the surface. When marble dust has been thus treated with or subjected to the action of water, and is afterwards mixed with other substances, as lead and zinc, and then ground or mixed with oil, or any suitable thinner, it is found that it spreads as easily and evenly on new work as on old, and readily leaves the brush, and will not roll upon or from the surface on which spread, and covers as completely and perfectly and uniformly as paints made from other ingredients, and as the ordinary lead and zinc paints.

The marble may be ground or pulverized in water, and nearly or quite the same result be obtained as by stirring and mixing it with water after it has been ground; but it is considered the most expeditious and satisfactory method to first pulverize the marble, and then treat it substantially as described with water. When so treated, also, it is found that it is particularly well adapted, without any admixture of lead or zinc, for making kalsomine to whiten walls, and it makes a much more durable covering than the ordinary substances used for such purpose. It will also readily take oil or water colors, and is highly suitable for frescoing walls.

What I claim as my invention, and desire to secure by Letters Patent, is—

1. Subjecting marble dust, or finely pulverized marble, when used in the composition or manufacture of paint, and for similar purposes, to the action of water, substantially as and for the purposes set forth.

2. The use of marble dust, when so treated or prepared, in the manufacture of kalsomine or covering for walls, ceilings, &c.

H. CURTIS.

Witnesses:
 FRED. B. SEARS,
 S. D. LAW.